(12) United States Patent
Brogan et al.

(10) Patent No.: US 12,497,947 B2
(45) Date of Patent: Dec. 16, 2025

(54) OPERATING A WIND TURBINE IN AN OFF-GRID STAND-ALONE MODE

(71) Applicant: Siemens Gamesa Renewable Energy A/S, Brande (DK)

(72) Inventors: Paul Brian Brogan, Glasgow (GB); Douglas Elliott, Glasgow (GB); Thyge Knueppel, Værløse (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/038,416

(22) PCT Filed: Nov. 8, 2021

(86) PCT No.: PCT/EP2021/080929
§ 371 (c)(1),
(2) Date: May 23, 2023

(87) PCT Pub. No.: WO2022/111982
PCT Pub. Date: Jun. 2, 2022

(65) Prior Publication Data
US 2024/0093670 A1 Mar. 21, 2024

(30) Foreign Application Priority Data
Nov. 30, 2020 (EP) .................... 20210627

(51) Int. Cl.
*F03D 7/02* (2006.01)
*H02J 3/38* (2006.01)
(52) U.S. Cl.
CPC .......... *F03D 7/0284* (2013.01); *H02J 3/388* (2020.01); *H02J 2300/28* (2020.01)
(58) Field of Classification Search
CPC ...... F03D 7/0284; H02J 3/388; H02J 2300/28
See application file for complete search history.

(56) References Cited

U.S. PATENT DOCUMENTS 7,687,937 B2  3/2010  Lasseter et al.
2014/0015249 A1  1/2014  Chern
(Continued)

FOREIGN PATENT DOCUMENTS

EP  2335336 B1  12/2013
EP  2753825 A2  7/2014
(Continued)

OTHER PUBLICATIONS

Tayab et al., A review of droop control techniques for microgrid, Renewable and Sustainable Energy Reviews, Mar. 27, 2017 (Year: 2017).*

(Continued)

*Primary Examiner* — Sean Gugger
(74) *Attorney, Agent, or Firm* — Schmeiser, Olsen & Watts LLP (57) ABSTRACT

A method of operating a wind turbine during disconnection from a utility grid includes a generator, a wind turbine converter, in particular including a grid side converter portion connectable to the utility grid, a DC link, a generator side converter portion, and a UPS, the method including: allowing the UPS to draw, according to an UPS active power reference, active power from the wind turbine converter (104); controlling the wind turbine converter by a converter power reference to meet the UPS active power reference. Controlling the wind turbine converter by the converter power reference includes modulating a frequency of the converter terminal voltage in dependence of the converter power operating point, in particular the converter power reference.

14 Claims, 3 Drawing Sheets

(56) References Cited

U.S. PATENT DOCUMENTS

2014/0225369 A1* 8/2014 Bodewes ................. H02P 9/00
                                                    290/44
2021/0215137 A1* 7/2021 Damgaard ............. F03D 7/044

FOREIGN PATENT DOCUMENTS

WO    WO 2010022766 A1    3/2010
WO    WO 2019223845 A1    11/2019

OTHER PUBLICATIONS

Abusara, M. et al: "Line-Interactive UPS for Microgrids"; IEEE; Transactions an Industrial Electronics; vol. 61; vol. 3; pp. 1292-1300; May 16, 2013; DOI: 10.1109/TIE.2013.2262763.
European Search Report issued on May 21, 2021 for application No. EP 20210627.4.
International Search Report and Written Opinion of the International Searching Authority issued on Feb. 11, 2022 for application No. PCT/EP2021/080929.

* cited by examiner

OPERATING A WIND TURBINE IN AN OFF-GRID STAND-ALONE MODE

CROSS-REFERENCE TO RELATED APPLICATIONS

This application claims priority to PCT Application No. PCT/EP2021/080929, having a filing date of Nov. 8, 2021, which claims priority to EP Application No. 20210627.4, having a filing date of Nov. 30, 2020, the entire contents both of which are hereby incorporated by reference.

FIELD OF TECHNOLOGY

The following relates to a method and to an arrangement of operating a wind turbine comprising a generator, a wind turbine converter, in particular comprising a grid side converter portion and a generator side converter portion, and a UPS, during disconnection from a utility grid. Further, the following relates to a wind turbine comprising the arrangement.

BACKGROUND

EP 2 335 336 B1 describes a wind turbine configuration, wherein the UPS is charged directly from the generator thereby bypassing the wind turbine converter.

EP 2 753 825 A2 discloses a method and system for generating auxiliary power for an islanded wind turbine wherein the rotational speed of the wind turbine is adjusted to a value within a range of low rotational speeds and the generator output is converted to a value suitable for charging an auxiliary power distribution system.

Abusara, M. & al.: "Line-interactive UPS for Microgrids", IEEE Transactions on Industrial Electronics, 61 (3), 1292-1300, 16 May 2013 (2013 May 16) discloses line-interactive uninterruptable power supply systems for microgrids. It is disclosed that in the grid-connected mode, power can be imported from the grid by the UPS to charge its battery.

The document WO 2019/223845 A1 discloses a wind turbine with integrated battery storage. A controller is configured to selectively control the voltage over the battery storage by controlling the status of at least two semiconductor switches.

An operational wind turbine generator (WTG) may, in addition to produce active power as captured from the wind, also consume an amount of power in order to keep its internal system and components in operation and in healthy condition. The WTG own consumption is sometimes called auxiliary load and may consist for example of a control system, hydraulic pumps, motors, environmental control, cooling etc. The auxiliary load may, during normal operation, be only a small fraction of the power production capabilities of the WTG.

In normal operation, where the wind turbine is connected to a utility grid and is producing electrical energy, the wind turbine draws the required auxiliary power from either its own power production or from the connecting utility grid, if for example the available own power cannot cover the auxiliary load. If, however, the electrical infrastructure between the wind turbines and the connected utility power grid is either 1) damaged due to a fault or 2) not yet commissioned if the wind farm is in construction phase, it may not be possible for the wind turbines auxiliary power demand to be met.

When there is not enough power to keep the auxiliary load in operation, the wind turbine may not be capable to yaw into the wind, keep humidity out of electrical components, communicate with the outside world, such as a controller, keep safety systems online and so on. Thereby, severe consequences for the integrity of the wind turbine, depending on the duration and the environment in which the wind turbine is located, may result.

Conventionally, in a grid disconnected situation, the auxiliary load may be supplied with required energy as delivered from for example Diesel generators that are added to either the wind farm network or locally to one or more wind turbines. For large offshore wind farms, it may be especially problematic, as the diesel generators must be fitted into jackets or barges and sailed out to the wind farm where they must be maintained in a difficult environment.

Thus, for a grid disconnected situation, the conventional wind turbine may not be operable in all environmental conditions in a reliable and safe manner.

Thus, there may be a need for a method and a corresponding arrangement of operating a wind turbine comprising a generator, a wind turbine converter, in particular comprising a grid side converter portion and a generator side converter portion, and a UPS, during disconnection from a utility grid, wherein the wind turbine may be properly operated and may be set into a predictable state, to either maintain operation during disconnection from the utility grid or perform a start-up in order to resume power production and eventually be connected to the utility grid.

SUMMARY

According to an embodiment of the present invention it is provided a method of operating a wind turbine during disconnection from a utility grid, the wind turbine comprising a generator, a wind turbine converter comprising a grid side converter portion connectable to the utility grid, a DC link and a generator side converter portion connected to the generator. The wind turbine further comprises a UPS which in turn comprises at least one electrical storage element. The method comprises: allowing the UPS to draw, according to a UPS active power reference (e.g. $P^*\_UPS$), active power (e.g. $P\_UPS$) from the wind turbine converter; controlling the wind turbine converter by a converter power reference (e.g. $P^*\_conv$) to meet the UPS active power reference (e.g. $P^*\_UPS$).

According to the embodiment of the present invention, controlling the wind turbine converter by the converter power reference ($P^*\_conv$) comprises: modulating a frequency (f) of a converter terminal voltage in dependence of a converter power operating point, in particular the converter power reference ($P^*\_conv$).

The method may for example be carried out by an arrangement for operating a wind turbine according to an embodiment of the present invention. The arrangement may for example be implemented in software and/or hardware which may also hold for the method. The arrangement and/or the method may for example be comprised in or carried out by a wind turbine controller or a control portion. The arrangement may be a part of a controller of the wind turbine.

During performing the method, a rotor at which plural rotor blades are mounted, which is connected to the generator, may be rotating due to impacting wind. During some time portion of performing the method, a rotor at which plural rotor blades are mounted, may not be rotating. Thereby also start-up may be supported.

The generator may for example comprise a synchronous electrical machine or an asynchronous electrical machine. The generator may for example comprise a synchronous permanent magnet electrical machine or a doubly fed induction generator (DFIG).

The wind turbine converter may comprise a grid side converter portion (which is connectable to the utility grid), a DC link and a generator side converter portion which may be connected to the generator. Upon rotation of the rotor having the rotor blades mounted thereon, electrical energy may be produced by the generator and is supplied as an AC power stream to the generator side converter portion. The generator side converter portion may comprise plural controllable power switches which may be capable of converting the AC power stream into substantially DC power which may be supplied to the DC link. The DC link may be connected to the grid side converter portion which may also comprise plural controllable power switches in order to transform the DC power to an AC power having a fixed predetermined nominal frequency, such as 50 Hz or 60 Hz.

During the entire method, the wind turbine may be disconnected from the utility grid. Thus, any wind turbine equipment requiring electric energy (also referred to as auxiliary equipment or auxiliary load) is not supplied electrical energy from the utility grid. Instead, the auxiliary equipment or auxiliary load is supplied with electric energy from the UPS (Uninterruptible Power Supply).

The UPS includes at least one electrical storage element being capable to store mechanical and/or electrical energy and supply electrical energy on demand depending on its level of charging. The UPS in turn, in particular for recharging, is connectable or connected to the wind turbine converter, in particular the grid side converter portion, to receive electrical energy or power from the wind turbine converter (for recharging). The UPS active power reference may for example be set according to the requirements of power or energy of the auxiliary load or auxiliary equipment, or from a combination of present auxiliary load and the state of charge of the UPS. For example, auxiliary equipment or auxiliary load may be selected such as to ensure safe and reliable and predictable operation of the wind turbine during the grid disconnected mode of operation. For example, essential functions such as control capability, yawing capability, pitching capability, cooling capability, humidity control and so on may be supplied with the required electrical energy thereby keeping the respective components running and operating. Other non-essential components, such as lights or similar components, may not be supplied with electric energy. In particular, all safety related components may be supplied with electric energy also in the grid disconnected operation mode.

The grid side converter portion may supply the electric power as demanded by the UPS. Thereby, the output power provided by the converter which is an AC power stream may internally (e.g. within the UPS) be converted into DC power that can be stored for example in an accumulator or a battery. It should be noted that the UPS may not comprise any combustion engine, such as a diesel generator.

The converter power reference may indicate the desired active power to be output by the converter, in particular the grid side converter portion. The power output by the converter may be output, according to the converter power reference, by appropriately controlling the terminal voltage of the grid side converter, which, in turn, is realised through the plural controllable power switches within the grid side converter portion. For example, a gate driver circuit may receive the converter switching commands and may, based on the switching commands, activate the power switches, such as IGBTs comprising within the grid side converter portion. For example, pulse width modulation (PWM) may be employed in calculating the switching commands.

Embodiments of the present invention enable the wind turbine to maintain itself during periods where the grid connection is not available without the need to bring external equipment, like diesel generators. This may be achieved by letting the wind turbine operate whenever there is sufficient wind to power the auxiliary load, i.e. operating the wind turbine in an off grid, stand-alone mode where it forms its own local electrical island. Thereby, the wind turbine is equipped with a UPS that allows it to operate for a period where the wind turbine is not producing any power. Thus, during portions of the method, the rotor may not be rotating and the generator may not produce electrical energy. In this phase, the UPS may maintain essential measurement and operation equipment, in order to for example detect wind direction and wind speed. If it is detected that the wind speed is sufficient in order to start producing energy, the UPS may power for example the yawing system in order to rotate the nacelle into the wind. Furthermore, the blade pitch angles may be controlled for allowing the rotor to start rotating due to impacting wind. Furthermore, any control equipment, such as control equipment for the generator and the converter, may be supplied with electrical energy initially from the UPS. Once the electrical energy or power as produced by the generator due to the rotating rotor is higher than the auxiliary load, UPS may be recharged by the surplus power. The wind turbine may also be operating and producing power even when the captured power does not cover the auxiliary load if, e.g. the trend in wind speed is such that the control system predicts that wind speed is increasing. In both situations, the UPS draws active power from the converter according to the UPS active power reference. Thereby, the method may also be performed for starting up an idling wind turbine, in particular a wind turbine where the rotor is initially not rotating.

The wind turbine converter is included in the power production loop during off grid stand-alone operation. The wind turbine is isolated from any wind farm network (including plural wind turbines), since one or more circuit breakers are opened, which may for example be located at the low voltage side or the medium voltage side of a wind turbine transformer. The (optional) wind turbine transformer may for example be connected to the grid side converter portion via a main circuit breaker and/or a converter reactor and/or filter.

In another embodiment wind turbines operating initially in stand-alone mode, may also be controlled to operate together in groups within the wind farm to form larger electrical islands. Here a 'group' may e.g. be a partial radial, a full radial, a collection of radials, a cluster, or the entire wind farm. In this case, one or more of the wind turbines are energising the electrical island after which one group of other wind turbines may start up and join the island. Another group of wind turbines may remain stopped but have their auxiliary load supplied from the operating wind turbines within the electrical island.

When the wind turbine is started up into off grid stand-alone operation, the UPS may supply the wind turbine auxiliary equipment with electrical energy and is also providing electrical power for pre-charging the main converter, i.e. the wind turbine converter. After the wind turbine converter has been started up and the power production has commenced, the UPS input may be supplied from the wind turbine converter such that the state of the charge can be kept at a desired level.

According to an embodiment of the present invention, the control method is configured such that the UPS is controlling the power flow between the wind turbine converter and the UPS. That means the UPS may pull power from the wind turbine converter which is making the requested active power available and is covering the losses of the system.

During performing the method, at least two main power balances must be met or observed and maintained when the system is operated. The first power balance may be the balance of power exchanged between the wind turbine converter and the UPS. The second balance may relate to the balance of power as exchanged from the wind turbine generator and the impacting wind or captured energy. It may be required that more power balances may be met, as will be described in detail below.

The first power balance, i.e. the balance between the wind turbine converter and the UPS, may be complied with or may be achieved by operating the grid side converter portion of the wind turbine converter as a voltage source with a variable voltage magnitude and variable frequency, which may make the wind turbine converter appear as a voltage source behind an inductance towards the UPS.

According to an embodiment of the present invention, controlling the converter by a converter power reference ($P^*\_conv$) comprises: modulating a frequency (f) (e.g. of converter output electricity or of local wind turbine power) in dependence of the active power operating point, that may be according to the converter power reference.

Thus, according to this design choice of this embodiment, the frequency (of the electricity output by the grid side converter portion) of the voltage source represented by the wind turbine converter, in particular the grid side converter portion, may behave like the frequency of a conventional AC power system and may increase if the load is reducing and decrease if the load is increasing. Thereby, the method may be performed in a simple manner and may not only apply in the grid disconnected situation, but may also continue to be applied during a grid connected situation, and in particular, during islanded operation where one or more wind turbines are operating together in an islanded electrical grid.

According to an embodiment of the present invention, the modulated frequency (f) is set the smaller the greater the converter power operating point and/or wherein the modulated frequency (f) is set the greater the smaller the converter power operating point. For a higher value of the converter power operating point a lower value for the modulated frequency (f) is set and vice-versa, for lower value of the converter power operating point the higher value for the modulated frequency (f) is set. This reflects a reverse proportional relationship between the converter power operating point and the modulated frequency (f). Thereby, reliable operation of the wind turbine during grid disconnection may be achieved.

In particular, the steady state active power balancing between the wind turbine converter and the UPS may be performed via a frequency to power droop that calculates a power reference reaction term as a function of a frequency, as will be described in detail below.

According to an embodiment of the present invention, the control is configured to achieve a linear relationship between converter power operating point and frequency. Thereby, a very simply relationship is provided, simplifying the method and improving reliability and safety.

According to an embodiment of the present invention, it is set:

$$P^*\_conv = P^*\_UPS + P losses,$$

wherein $P^*\_conv$ is the converter power reference;

$P^*\_UPS$ is the UPS active power reference;

Plosses are losses occurring between the converter and UPS.

That the converter power reference is the sum of the UPS active power reference and power losses may evolve during continued performance of the method by the particular control components. That means, the derived power reference for the wind turbine converter, $P^*\_conv$, may in the steady state be the sum of the active power drawn by the UPS and the losses in the system towards the UPS, as given above in the equation. Both active power components may essentially be unknown to the converter controller that, through its control, may be acting to balance the power, i.e. the grid side converter may be acting as a slack bus with respect to the UPS. The wind turbine converter may draw the required power from the wind turbine generator to satisfy the internal power balance of the wind turbine converter.

According to embodiments of the present invention it is assumed that the active power drawn by the UPS is not a function of the frequency, i.e. $P\_UPS (f)$=constant, although this is not a requirement for the setup to work.

According to an embodiment of the present invention, the UPS power reference is set such as to keep a charge of the UPS at a desired level.

When the charge of the UPS is kept at a desired minimum level, the UPS may provide sufficient energy also for example starting up an idling wind turbine in a grid disconnected situation. Temporarily, however, the UPS may be charged not at the desired level but at a level lower than the desired level.

According to an embodiment of the present invention, the method comprises: operating the converter as a voltage source; and/or operating the UPS as current source.

The active power must be balanced at all time in an electrical network irrespective of the size of the network. This means that if the power drawn at one node in the network changes, this change must be balanced at another node in the network when also considering that the losses may have changed by the changed power flow. Otherwise the electrical network will either collapse or experience voltages and/or frequencies outside of normal ranges. In practise, this means that not all units within a network can adhere strictly to their local power reference, since it may not practically be possible, even in the smallest of networks, to obtain knowledge of all power components.

A component that is operating as a current source is a component that is adhering strictly to its references for active and reactive (or voltage magnitude) power flow and is injecting the current required to meet those references. Conventionally, power electronics is operated as current injecting devices unless they specifically are required to create a network like, e.g. the output terminals of a UPS. Using the example from before, it would be very challenging to operate a network full of components operating as current sources as none of the units would inherently operate to balance the active and reactive power flows.

Contrary to this, a device that is operated as a voltage source will control the voltage amplitude and the frequency and may absorb the resulting current flow (within the ratings of the device). Such device therefore may act to balance the network, as current can be exchanged with the device as the network and the operation of other devices dictate.

A current injecting device may typically be realised by including a high bandwidth, e.g. 600 rad/s, closed loop current controller in the converter control such that the terminal voltage of the device is controlled as required to realise the current references.

There are different ways to control a converter as a voltage source. One method is to use droop control in the converter as e.g. disclosed in U.S. Pat. No. 7,687,937 B2. Another is to emulate the power balance of a synchronous generator within the converter control as e.g. disclosed in WO 2010/022766 A1.

According to an embodiment of the present invention, the UPS comprises at least one electrical storage element, in particular a battery and/or accumulator, and/or a UPS input converter and/or a UPS output converter, wherein the UPS input converter is connectable, in particular connected, with the wind turbine converter, and/or wherein the UPS output converter is connectable to wind turbine equipment requiring energy supply, wherein the electrical storage element is connectable with the UPS input converter and/or the UPS output converter.

Thereby, a combustion engine, such as a diesel engine, may be dispensed with. The UPS input converter may be capable of converting an AC power stream to a DC power. The UPS output converter may be capable of converting a DC power to an AC power appropriate for reception by the wind turbine auxiliary equipment. Thereby, a reliable energy supply may be provided in a grid disconnected situation, in particular also temporarily in a situation, where the rotor is not rotating. The UPS may be appropriately dimensioned such that at the minimum charging level, electrical wind turbine auxiliary equipment may be supplied with electrical energy, in order to enable starting up the wind turbine.

According to an embodiment of the present invention, the UPS, in particular the UPS input converter, is connectable, in particular connected, via a converter reactor and/or a breaker and/or an auxiliaries filter and/or a UPS input reactor to the wind turbine converter.

The converter reactor may for example filter out higher harmonics. Also, the UPS input reactor and the auxiliary filter may filter out higher harmonics which may disturb operation, if not reduced or attenuated. In particular, the breaker which may be arranged in a connecting line between the UPS and the wind turbine converter may be closed essentially during the entire time duration of the method. In contrast, when the wind turbine is reconnected to the utility grid, the switch may at least temporarily be opened. During connection to the utility grid, the UPS may be charged by electric energy supplied from the utility grid. For this charging, the respective breaker may be closed.

According to an embodiment of the present invention, the method further comprises determining a UPS active power limit in dependence of at least two operational parameters such as to adhere to a power balance requirement and limiting the UPS active power reference (P*_UPS) to adhere to the UPS active power limit.

The UPS active power limit may be set in order to comply with a second power balance which may be required in order not violate the law of energy conservation. The UPS active power limit may limit the UPS active power reference such that the second power balance is complied with or met. The two operational parameters may relate to electrical and/or mechanical quantities which may be indicative of the power flow at at least two locations within the power flow path. The operational parameters may for example include electrical and/or mechanical parameter values which may be selected depending on the particular application. The operational parameters may for example comprise current and/or voltage at (input and/or output of) the grid side converter portion and/or (input and/or output of) the generator side converter portion, such as respective input currents or voltages or output voltages or output currents. Thereby, a great flexibility is provided for determining the UPS active power limit.

According to an embodiment of the present invention, the operational parameters include at least one of: current and/or voltage of output of the grid side converter portion; current and/or voltage of input of the generator side converter portion; rotational speed of the rotor; a wind power; a generator active power output; a converter active power output. From one or more of those example parameters, values may be derived which may indicate whether the power balance is met.

According to an embodiment of the present invention, determining a UPS active power limit comprises: receiving, by a converter controller, the converter power reference (P*_conv) and in particular the operational parameters; deriving, by the converter controller, a converter power limit; in particular restricting the converter power limit to adhere to at least one predetermined converter power limit; determining the UPS active power limit based on the, in particular restricted, converter power limit; and restricting a preliminary (unlimited) UPS active power reference (P*_UPS unlimited) by the UPS active power limit, to derive the UPS active power reference (P*_UPS). Thereby, a particular implementation is provided. This implementation will be described in detail below.

The UPS active power limit may, equally, be determined by a control function that is operating on the wind turbine controller. This could be the wind turbine control system enforcing a speed/power limit or the reaction to component temperature measurements being too high due to e.g. a malfunction.

According to an embodiment of the present invention, the wind turbine converter is connectable, in particular via a converter reactor and/or a breaker and/or a wind turbine transformer, to the utility grid. The converter reactor may advantageously reduce higher harmonics and the wind turbine transformer may advantageously transform the voltage of the output power to a higher value, in order to lower losses during transmission to the utility grid.

It should be understood that features, individually or in any combination, disclosed, described, explained or provided for a method of operating a wind turbine comprising a generator, a converter and a UPS also apply, individually or in any combination, to an arrangement for operating a wind turbine comprising a generator, a wind turbine converter, in particular comprising a grid side converter portion and a generator side converter portion, and a UPS, according to an embodiment of the present invention and vice versa.

According to an embodiment of the present invention it is provided an arrangement for operating a wind turbine during disconnection from a utility grid, the wind turbine comprising a generator, a wind turbine converter which in turn comprises a grid side converter portion connectable to the utility grid, a DC link and a generator side converter portion connected to the generator, the wind turbine further comprises a UPS, the arrangement comprising: a UPS controller configured to allow the UPS to draw, according to a UPS active power reference (e.g. P*_UPS), active power (e.g. P_UPS) from the wind turbine converter; a converter controller configured to control the wind turbine converter by a converter power reference (e.g. P*_conv) to meet the UPS active power reference (e.g. P*_UPS), the arrangement being configured to carry out or control a method according to previous embodiments.

According to an embodiment of the present invention it is provided a wind turbine, comprising: a generator; a wind turbine converter, in particular comprising a grid side converter portion and a generator side converter portion, connected to the generator; a UPS connectable to the converter; and an arrangement according to the preceding embodiment, connected to control the UPS and the wind turbine converter.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

Figure 1:
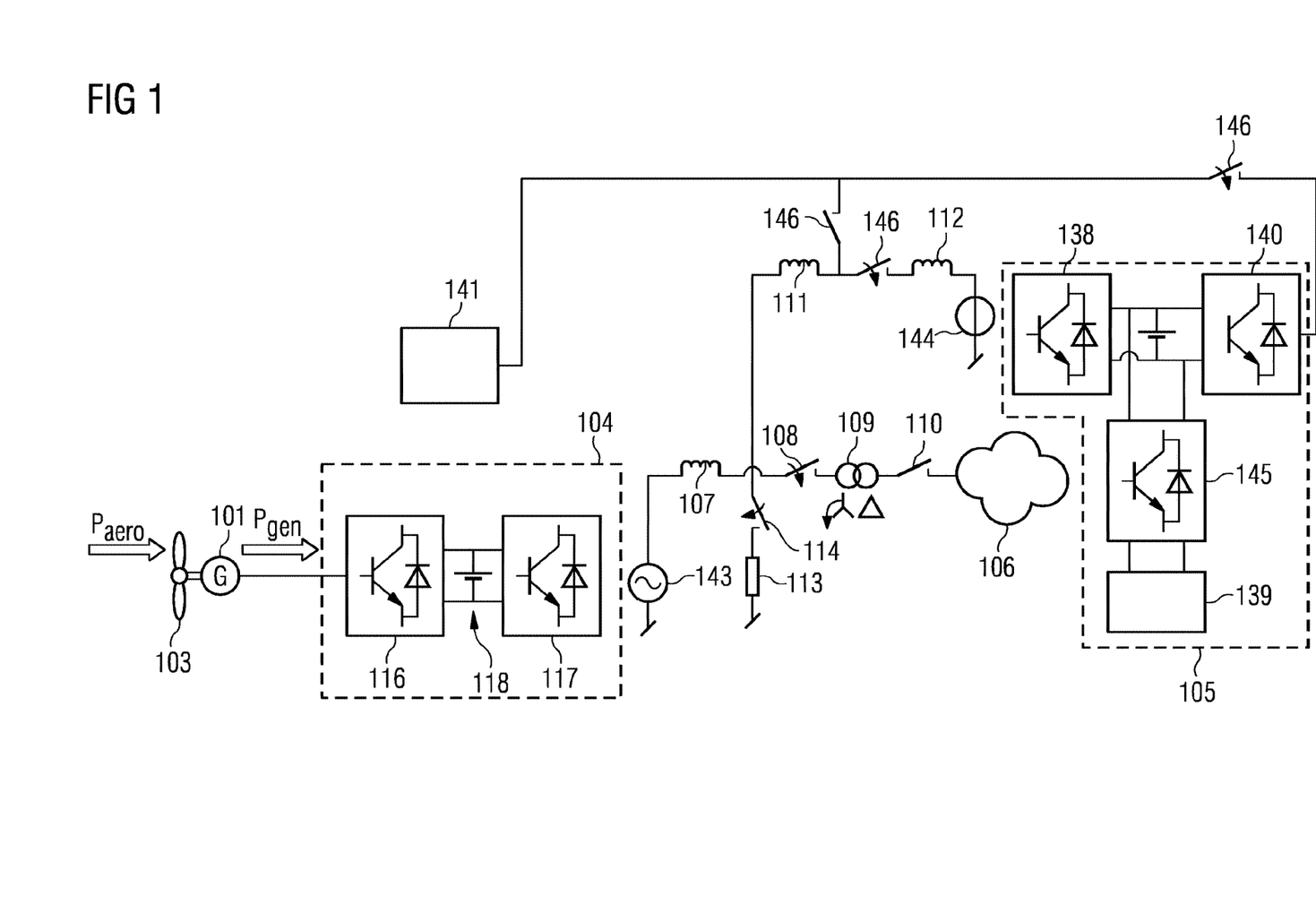
FIG. 1 schematically illustrates a wind turbine according to an embodiment of the present invention.

The wind turbine 100 schematically illustrated in FIG. 1 comprises a generator 101 which is coupled to a rotor 102 at which plural rotor blades 103 are mounted. Upon rotation of the rotor 102, the generator 101 produces electric energy and supplies it to a connected converter 104 as representing a wind turbine converter. The converter output behaves as and is represented as a voltage source 143 in FIG. 1.

The wind turbine 100 further comprises a UPS 105 which is connectable to the wind turbine converter 104. The UPS behaves as and is represented as a current source 144 in FIG. 1. The UPS 105 comprises converters 138, 140, 145 and a storage 139. The UPS 105 is connected to the wind turbine converter 104 via the converter reactor 107, an auxiliary filter 111 and a UPS input reactor 112. In other embodiments, one or more of the converter reactor 107, the auxiliary filter 111 and/or the UPS input reactor 112 may be missing.

Switches 146 allow interruption or connection as required.

During normal operation, the converter 104 is connected to a utility grid 106. Thereby, between the converter 104 and the utility grid 106, a converter reactor 107, a main circuit breaker 108, a turbine transformer 109 and a further breaker 110 are connected. The wind turbine further comprises a PWM filter 113 (connected to the converter reactor 107) which is shunt-connected. A PWM filter breaker 113 allows to connect the PWM filter 113 or disconnected. By opening one of the switches 108, 110, the converter 104 may be disconnected from the utility grid 106. Opening switch 110 disconnects the entire wind turbine 100 from the utility grid. This may for example be required or done during a fault condition, e.g. a damaged cable that require repair, within the utility grid 106 that prevents the wind turbine from operating to electrically separate the wind turbine infrastructure from that of the utility grid and thereby allow the wind turbine electrical infrastructure to be energised.

In the embodiment illustrated in FIG. 1, the wind turbine main converter 104 is represented as a voltage source with variable voltage and frequency. Furthermore, the UPS 105 is represented as a current source which is controlled to sink a specified amount of active power. Electrically, the wind turbine main converter 104 is operated as a slave or as a slack bus, that balances the active and reactive power of the system. In the embodiment as illustrated in FIG. 1, the wind turbine generator has no independent control over active power and limitations to the power flow may be achieved via the UPS 105.

The wind turbine 100 includes an arrangement 150 according to an embodiment of the present invention for operating the wind turbine 100 that controls the UPS 105 as well as the converter 104 by control signals 123, 124, as will be described in detail below. The control is such that two main power balances are observed and maintained when operating the system: That is 1) between the wind turbine main converter and the UPS and 2) between the wind turbine captured energy and the wind turbine generator output power.

Figure 2:
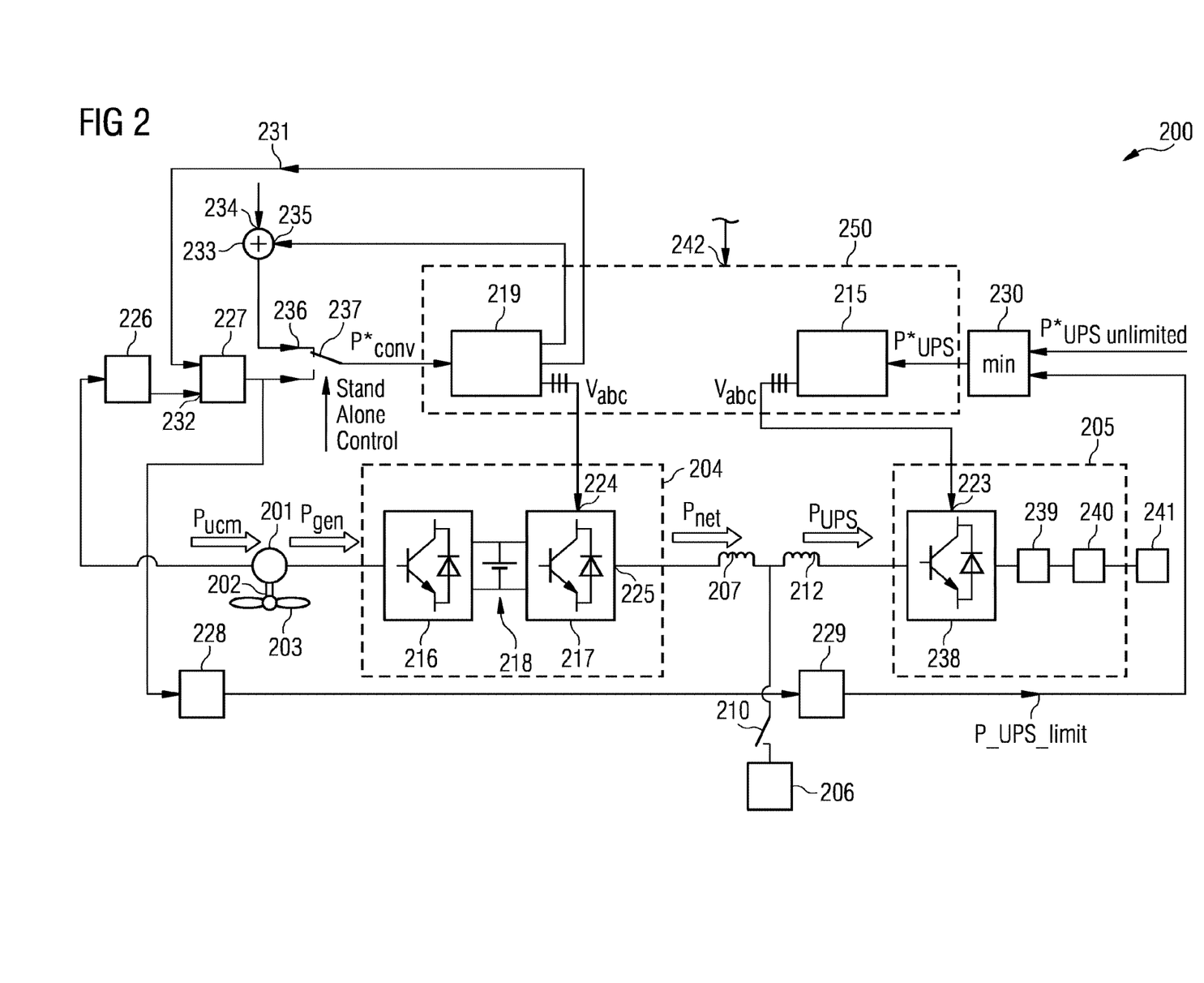
FIG. 2 schematically illustrates a wind turbine according to an embodiment of the present invention including an arrangement for operating a wind turbine according to an embodiment of the present invention.

FIG. 2 schematically illustrates a wind turbine 200 according to another embodiment of the present invention including an arrangement 250 according to an embodiment of the present invention for operating the wind turbine 200.

Therein, the arrangement 250 comprises a UPS controller 215 which is configured to control the UPS 205 by control signal 223, in order to allow the UPS 205 to draw, according to an UPS active power reference P*_UPS, active power P_UPS from the converter 204. Therein, the converter 204 comprises a generator side converter portion 216 and a grid side converter portion 217 which are connected via a DC link 218. The arrangement 250 further comprises a converter controller 219 which is configured to control the converter 204 by control signal 224, to achieve the control objective of e.g. a converter power reference P*_conv, to meet the UPS active power reference P*_UPS. The arrangement 250 is configured to carry out or control a method of operating a wind turbine according to an embodiment of the present invention.

As has been mentioned above, the wind turbine converter 204, in particular its grid side converter portion 217, may be operated as a voltage source. The frequency of the voltage source created by the converter 204 may behave like the frequency of a normal AC power system and will increase if the load is reducing and decrease if the load is increasing.

Figure 3:
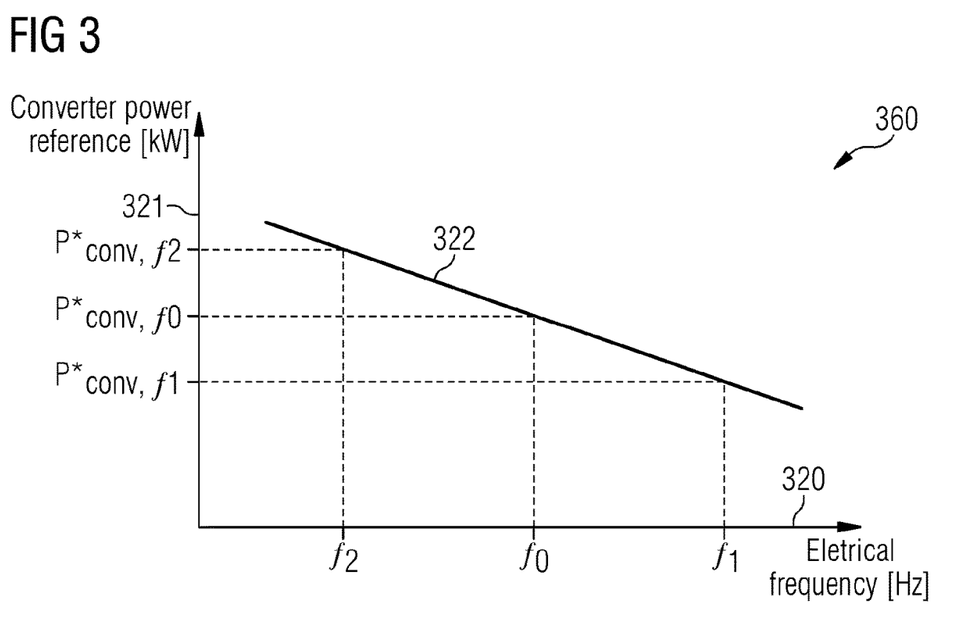
FIG. 3 illustrates a graph illustrating a relationship of power reference and electrical frequency as employed in embodiments of the present invention.

FIG. 3 illustrates a graph 360 in a coordinate system having an abscissa 320 indicating the electrical frequency (output by the wind turbine converter, for example converter 204 or 104 illustrated in FIG. 2 or 1) and having an ordinate 321 indicating the converter power reference P*_conv. The curve 322 indicates the relationship between the converter power reference P*_conv and the electrical frequency. As can be appreciated from FIG. 3, the modulated frequency is in dependence of the converter power operating point. For example, for the converter power operating point given by converter power reference P*_conv_f1, the frequency f1 is modulated. For the converter power operating point given by converter power reference P*_conv_f0, the frequency f0 is modulated and for the converter power operating point given by converter power reference P*_conv_f2, the frequency f2 is modulated.

As can be seen from the curve 322 in FIG. 3, the frequency f is determined in dependence of the converter power operating point given by converter power reference P*_conv. As can also be seen from the curve 322, the modulated frequency f is smaller the greater the converter power operating point given by converter power reference P*_conv and the modulated frequency f is greater the smaller the converter power operating point given by converter power reference P*_conv.

The arrangement illustrated in FIG. 2 controls the UPS 205 as well as the wind turbine main converter 204, by respective control signals 223 and 224. Thereby, for example, the control signal 224 as supplied from the converter controller 219 to the converter 204 may indicate a terminal voltage command in the abc coordinate system and which may also indicate thereby the frequency to be set at the output terminal 225 of the grid side converter portion 217 of the converter 204 (e.g. according to curve 322 of FIG. 3). The output power at the output terminal 225 of the grid side converter portion 217 is labelled as P_net.

Similarly, the UPS controller 215 controls the UPS 205 by a control signal 223 which may also indicate the voltage in the abc coordinate system, which are computed to e.g. achieve the active power to be drawn by the UPS which is labelled by P_UPS in FIG. 2. During performing the method, at least in the steady state it may be assured that P_net=P*_conv=P*_UPS+P_losses_net (P_losses_net are losses between output terminal 225 of converter 204 and input of UPS 205). Thereby, a first power balance may be complied with.

In FIG. 2, further control blocks are illustrated, such as wind turbine control block 226, power limitations block 227, UPS power limitation calculation block 228, communications block 229 and limiter or minimum determination block 230. Those modules may or may not be comprised in the arrangement 250.

The minimum determination block 230 receives as input signal a preliminary UPS active power reference P*_UPS unlimited. This preliminary UPS active power reference may for example be set such as to keep a charge of the UPS 205 at a desired level.

If sufficient power is produced by the generator 201 and if no further power limitations or any other limit values are violated, namely if the preliminary UPS active power reference (P*_UPS unlimited) is smaller than a UPS active power limit P_UPS limit, then the UPS active power reference P*_UPS is set to the preliminary UPS active power reference P*_UPS unlimited.

However, if the preliminary UPS active power reference P*_UPS unlimited is greater than the UPS active power limit P_UPS limit, then the UPS active power reference P*_UPS is set to the UPS active power limit P_UPS limit.

The UPS active power limit in turn is derived by the UPS power limit calculation block 228 which receives the output of the power limitations block 227. In the power limitations block 227, potentially plural limit requirements may be checked. The power limitations block 227 receives a converter power limit 231 which is output by the converter controller 219. The power limitations block 227 receives further an output signal 232 of the wind turbine power controller module 226. The wind turbine power controller module 226 thereby receives measurement values regarding wind power and/or wind speed and/or rotor or generator speed for example. For example, the wind turbine power controller module 226 receives the quantity P_aero, e.g. the power as dictated by the impacting wind.

The output signal 232 by the wind turbine power control module 226 is supplied to the power limitations block 227.

An addition element 233 receives a nominal value for power reference during off-grid standalone operation 234.

The nominal value for power reference during off-grid standalone operation provides an offset to the requested change in power reference that is calculated in the wind turbine converter control. That is, the total converter power reference is the sum of the offset, i.e. the nominal value for power reference during off-grid standalone operation, and the requested change in power reference. The signals provide a 'base' or 'nominal' power around which the control is operating and can thereby effectively offset the droop curve in FIG. 3 on the ordinate.

The addition element 233 further receives a signal 235 representing the converter-island-mode-A-power-reference-request as output by the wind turbine converter controller 219. The sum signal of the signals 234 and 235, labelled with reference sign 236, is supplied to the wind turbine converter controller 219. The sum signal 236 will be equal to the converter power reference P*_conv, which in steady state will equal the output power of the grid side converter. That is, the UPS can, within its received power limit, operate freely and draw the active power that its internal control decides, and the described control arrangement ensures that the grid side converter delivers the required power to balance the system and deliver a steady state operating point along the droop curve in FIG. 3.

With reference again to FIG. 3 it may be assumed that the system is initially in a steady state condition where the UPS is drawing a constant power, is for example delivered at a constant frequency. If the UPS is then increasing the power that it is drawing from the wind turbine main converter, the frequency of the voltage that the grid side converter is modulating may be reduced and, according to the frequency to power droop, the wind turbine active power output will be increased, that is, the active power is balanced at a new and reduced frequency level. Thus, curve 322 represents the frequency/power droop that the wind turbine converter is operated with.

With the grid side of the wind turbine main converter operating as a slack bus, power limits from the wind turbine generator side cannot be imposed via the main converter and the second power balance between the input power and output power of the wind turbine can be achieved by imposing limits to the power drawn by the UPS. Therefore, the UPS power limit P_UPS limit is calculated and utilized to potentially restrict a preliminary UPS active power reference and UPS unlimited, as is illustrated in FIG. 2.

The power limit calculation block in 228 is mapping between the limit value as requested by the wind turbine control and/or wind turbine converter control and the required limit value that must be applied at the UPS end to achieve the required limit in wind turbine power output. That is, if the UPS receives the output of 227 directly, the power output of the grid side converter, Pnet, would exceed this limit as e.g. losses or any additional load between the grid side converter and the UPS input terminal would not be encountered for. The mapping may be disregarded if the difference is considered sufficiently small.

In a normal operation (during connection of the wind turbine to utility grid 206), the switch 237 is connecting the output of the power limitations block 227 with the input of the converter controller 219. Illustrated is the setting of the switch 237 in the case of a disconnection from the utility grid 206. In FIG. 2, the utility grid may for example be connected to the output terminal 225 of the converter 204, optionally via a wind turbine transformer. Alternatively, the utility grid may be connected between the converter reactor 207 and the UPS input reactor 212. When the wind turbine is operated grid connected, the converter may be controlled as a current source.

The UPS 205 illustrated in FIG. 2 comprises a UPS input converter 238, at least one electrical storage element 239 and a UPS output converter 240. The output terminal of the output converter 240 of the UPS 205 is connected to wind turbine auxiliary equipment 241.

For performing the method, the arrangement 250 receives input signals 242 regarding at least two operational parameters of the wind turbine. The input signals 242 may for example comprise information regarding current and/or voltage of input and/or output of the grid side converter portion 217 and/or the generator side converter portion 216. The input signals 242 may additionally or alternatively also comprise for example information regarding P_aero or P_gen, i.e. the power as generated by the generator 201. The input signals 242 may in particular be supplied to the converter controller 219.

Embodiments of the present invention may provide particular advantages. Including the wind turbine converter in the loop during off-grid situation, i.e. stand-alone operation, may mean that the system is also compatible with black start and island mode operation where multiple wind turbines are connected to the same electrical island.

Thus, according to an embodiment of the present invention, a wind farm is provided with plural wind turbines as indicated for example in FIG. 1 or 2. For example, multiple wind turbines operating in island mode may be supported, where the load is shared between the operating wind turbines. Thereby, great flexibility in terms of supplying the auxiliary load is provided, as a non-operational wind turbine can still be kept energized from neighbouring wind turbines. Furthermore it is possible to only equip every kth wind turbine with a UPS system and thereby reduce the cost of the wind farm. Instead of treating each wind turbine as an independent electrical entity, it is also possible to create larger electrical islands consisting of for example two or more wind turbines.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine during disconnection from a utility grid, the wind turbine comprising a generator, a wind turbine converter comprising a grid side converter portion connectable to the utility grid, a DC link and a generator side converter portion connected to the generator, the wind turbine further comprising an uninterruptable power supply (UPS) which in turn comprises at least one electrical storage element, the method comprising:

controlling, by a UPS controller, the UPS to allow the UPS to draw, according to a UPS active power reference, active power from the wind turbine converter in a grid disconnected state, wherein the UPS active power reference is set according to requirements of power or energy of an auxiliary load or an auxiliary equipment, or from a combination of a present auxiliary load and a state of charge of the UPS; and controlling, by a converter controller, the wind turbine converter with a control signal sent by the converter controller to the wind turbine converter that indicates a converter power reference to meet the UPS active power reference, wherein the controlling the wind turbine converter by the converter power reference comprises:

modulating a frequency of a converter terminal voltage in dependence of a converter power operating point, wherein the control signal sent by the converter control indicates a terminal voltage command and the frequency to be set at an output terminal of the grid side converter portion of the wind turbine controller, and maintaining at least two main power balances during grid-disconnected operation, wherein a first power balance is between the wind turbine converter and the UPS, and a second power balance is between power exchanged from the wind turbine generator and impacting wind or captured energy, wherein the first power balance is achieved by operating the grid side converter portion as a voltage source with variable voltage magnitude and frequency to appear as a voltage source behind an inductance towards the UPS.

2. The method according to claim 1, wherein the smaller the modulated frequency, the greater the converter power operating point as given by the converter power reference and/or wherein the greater the modulated frequency, the smaller the converter power operating point as given by the converter power reference.

3. The method according to claim 1, wherein the frequency has a linear relationship with the converter power operating point such that the frequency linearly decreases as the converter power operating point increases as given by the converter power reference.

4. The method according to claim 1, wherein in steady state the converter power reference is determined by:

$$P^*\_conv = P^*\_UPS + Plosses,$$

wherein:

$P^*\_conv$ is the converter power reference;

$P^*\_UPS$ is the UPS active power reference;

Plosses are losses occurring between the wind turbine converter and the UPS.

5. The method according to claim 1, wherein the UPS power reference is set such as to keep a charge of the UPS at a desired level.

6. The method according to claim 1, comprising: operating the UPS as a current source.

7. The method according to claim 1, wherein the UPS comprises a battery and/or an accumulator, and/or a UPS input converter and/or a UPS output converter, wherein the UPS input converter is connectable with the wind turbine converter, and/or wherein the UPS output converter is connectable to wind turbine auxiliary equipment requiring power supply, wherein the electrical storage element is connectable with the UPS input converter and/or the UPS output converter.

8. The method according to claim 7, wherein the UPS input converter, is connectable via a converter reactor and/or a breaker and/or an auxiliaries filter and/or a UPS input reactor, to the wind turbine converter.

9. The method according to claim 1, further comprising:
determining a UPS active power limit in dependence of at least two operational parameters to adhere to a power balance requirement;
limiting the UPS active power reference to adhere to the UPS active power limit.

10. The method according to claim 9, wherein the operational parameters include at least one of:
current and/or voltage of input and/or output of the grid side converter portion;
current and/or voltage of input and/or output of the generator side converter portion;
rotational speed of the rotor;
a wind power;
a wind speed;
a generator active power output;
a converter active power output; and
at least one power loss.

11. The method according to claim 9, wherein determining a UPS active power limit comprises:
receiving, by a converter controller, the converter power reference and the operational parameters;
deriving, by the converter controller, a converter power limit;
restricting the converter power limit to adhere to at least one predetermined converter limit;
determining the UPS active power limit based on the restricted, converter power limit; and
restricting a preliminary UPS active power reference by the UPS active power limit, to derive the UPS active power reference.

12. The method according to claim 1,
wherein the wind turbine converter is connectable via a converter reactor and/or a breaker and/or a wind turbine transformer, to the utility grid.

13. An arrangement for operating a wind turbine during disconnection from a utility grid, the wind turbine comprising a generator, a wind turbine converter which in turn comprises a grid side converter portion connectable to the utility grid, a DC link and a generator side converter portion connected to the generator, the wind turbine further comprising an uninterruptable power supply (UPS), the arrangement comprising:

a UPS controller configured to control the UPS to allow the UPS to draw, according to a UPS active power reference, active power from the wind turbine converter in a grid disconnected state, wherein the UPS active power reference is set according to requirements of power or energy of an auxiliary load or an auxiliary equipment, or from a combination of a present auxiliary load and a state of charge of the UPS;

a converter controller configured to control the wind turbine converter with a control signal sent by the converter controller to the wind turbine converter that indicates a converter power reference to meet the UPS active power reference, the arrangement being configured to;
modulate a frequency of a converter terminal voltage in dependence of a converter power operating point, wherein the control signal sent by the converter control indicates a terminal voltage command and the frequency to be set at an output terminal of the grid side converter portion of the wind turbine controller, maintain at least two main power balances during grid-disconnected operation, wherein a first power balance is between the wind turbine converter and the UPS, and a second power balance is between power exchanged from the wind turbine generator and impacting wind or captured energy, wherein the first power balance is achieved by operating the grid side converter portion as a voltage source with variable voltage magnitude and frequency to appear as a voltage source behind an inductance towards the UPS.

14. A wind turbine, comprising:
a generator;
a wind turbine converter comprising a grid side converter portion and a generator side converter portion, connected to the generator;
an uninterruptable power supply (UPS) connectable to the wind turbine converter; and
the arrangement according to claim 13, connected to control the UPS and the wind turbine converter.

* * * * *